(12) United States Patent
Norair

(10) Patent No.: US 9,379,808 B2
(45) Date of Patent: Jun. 28, 2016

(54) METHOD AND APPARATUS FOR LOW-POWER, LONG-RANGE NETWORKING

(71) Applicant: Blackbird Technology Holdings, Inc., Dover, DE (US)

(72) Inventor: John Peter Norair, San Francisco, CA (US)

(73) Assignee: Blackbird Technology Holdings, Inc., Dover, DE (US)

( * ) Notice: Subject to any disclaimer, the term of this patent is extended or adjusted under 35 U.S.C. 154(b) by 0 days.

(21) Appl. No.: 14/719,401

(22) Filed: May 22, 2015

(65) Prior Publication Data

US 2015/0349878 A1 Dec. 3, 2015

Related U.S. Application Data

(63) Continuation of application No. 13/267,621, filed on Oct. 6, 2011, now Pat. No. 9,042,353.

(60) Provisional application No. 61/404,541, filed on Oct. 6, 2010.

(51) Int. Cl.
*H04J 3/00* (2006.01)
*H04B 7/26* (2006.01)
(Continued)

(52) U.S. Cl.
CPC ......... *H04B 7/2656* (2013.01); *H04W 72/0446* (2013.01); *H04W 48/16* (2013.01); *H04W 72/02* (2013.01); *H04W 72/042* (2013.01)

(58) Field of Classification Search
CPC ... H04W 48/16; H04W 72/02; H04W 72/042; H04W 72/0446; H04L 12/413; H04L 1/18
See application file for complete search history.

(56) References Cited

U.S. PATENT DOCUMENTS

| 5,338,625 A | 8/1994 | Bates |
| 5,465,398 A | 11/1995 | Flammer |

(Continued)

FOREIGN PATENT DOCUMENTS

| EP | 1321009 B1 | 1/2007 |
| JP | 2009/010449 A | 1/2009 |

(Continued)

OTHER PUBLICATIONS

PCT International Searching Authority, Notification Concerning Transmittal of the International Search Report and The Written Opinion of the International Searching Authority, or the Declaration, in International application No. PCT/US2011/55118, dated Feb. 28, 2012. (25 pages).

(Continued)

*Primary Examiner* — Brian O'Connor
(74) *Attorney, Agent, or Firm* — McAndrews, Held & Malloy, Ltd.

(57) ABSTRACT

An endpoint device may be operable to transmit and receive data wirelessly via a medium to which access is time-division multiplexed into a plurality of repeating windows. A first window of the plurality of repeating windows may be time-division multiplexed into a plurality of timeslots utilized for transmitting beacon signals. A second window of the plurality of repeating windows may be time-division multiplexed into a plurality of timeslots utilized for transmitting alarm signals. The endpoint may be assigned one of the first timeslots and, when an alarm condition is present, select one of the second timeslots for transmitting an alarm signal based on the assigned first timeslot, and based on a hash function. The endpoint may then transmit an alarm signal during the second timeslot. The endpoint may be operable to synchronize its local clock by listening to beacons transmitted by other endpoints.

47 Claims, 9 Drawing Sheets

(51) Int. Cl.
   *H04W 48/16*   (2009.01)
   *H04W 72/02*   (2009.01)
   *H04W 72/04*   (2009.01)

(56) References Cited

U.S. PATENT DOCUMENTS

| | | | |
|---|---|---|---|
| 5,615,366 | A | 3/1997 | Hansen |
| 5,729,557 | A | 3/1998 | Gardner et al. |
| 5,959,281 | A | 9/1999 | Domiteaux |
| 6,115,379 | A | 9/2000 | Flanders et al. |
| 6,307,846 | B1 | 10/2001 | Willey |
| 6,330,700 | B1 | 12/2001 | Morris |
| 6,356,442 | B1 | 3/2002 | Lunsford |
| 6,381,243 | B1 | 4/2002 | Ekstedt |
| 6,388,997 | B1 | 5/2002 | Scott |
| 6,424,301 | B1 | 7/2002 | Johnson |
| 6,452,569 | B1 | 9/2002 | Park |
| 6,525,928 | B1 | 2/2003 | Madsen |
| 6,549,959 | B1 | 4/2003 | Yates |
| 6,665,308 | B1 | 12/2003 | Rakib |
| 6,700,491 | B2 | 3/2004 | Shafer |
| 6,705,531 | B1 | 3/2004 | Norton |
| 6,714,559 | B1 | 3/2004 | Meier |
| 6,771,985 | B1 | 8/2004 | Iinuma |
| 7,009,941 | B1 | 3/2006 | Uchino |
| 7,072,431 | B2 | 7/2006 | Wang |
| 7,231,530 | B1 | 6/2007 | Miller et al. |
| 7,233,603 | B2 | 6/2007 | Lee |
| 7,280,555 | B2 | 10/2007 | Stanforth |
| 7,292,548 | B2 | 11/2007 | Lim |
| 7,293,088 | B2 | 11/2007 | Douglas |
| 7,305,237 | B2 | 12/2007 | Stephens |
| 7,308,103 | B2 | 12/2007 | Corcoran et al. |
| 7,315,248 | B2 | 1/2008 | Egbert |
| 7,330,446 | B2 | 2/2008 | Lee |
| 7,369,512 | B1 | 5/2008 | Shurbanov et al. |
| 7,554,981 | B2 | 6/2009 | Kecskemeti |
| 7,580,397 | B2 | 8/2009 | Arai |
| 7,606,256 | B2 | 10/2009 | Vitebsky |
| 7,643,509 | B2 | 1/2010 | Han |
| 7,663,878 | B2 | 2/2010 | Swan |
| 7,672,284 | B2 | 3/2010 | Sugar et al. |
| 7,689,195 | B2 | 3/2010 | Wu |
| 7,698,463 | B2 | 4/2010 | Ogier et al. |
| 7,735,116 | B1 | 6/2010 | Gauvin |
| 7,760,689 | B2 | 7/2010 | Shin |
| 7,805,129 | B1 | 9/2010 | Issa |
| 7,814,107 | B1 | 10/2010 | Thirumalai |
| 7,890,839 | B2 | 2/2011 | Iwami |
| 7,941,149 | B2 * | 5/2011 | Wang ............... H04L 12/5695 370/235 |
| 7,941,197 | B2 | 5/2011 | Jain |
| 7,962,361 | B2 | 6/2011 | Ramchandani |
| 8,035,488 | B2 | 10/2011 | Shiotsu |
| 8,036,715 | B2 | 10/2011 | Buck |
| 8,325,665 | B2 | 12/2012 | Kim |
| 8,340,796 | B2 | 12/2012 | Stefik |
| 8,351,409 | B2 | 1/2013 | Albert |
| 8,483,196 | B2 | 7/2013 | Wang |
| 8,554,271 | B2 | 10/2013 | Wang |
| 8,599,687 | B1 | 12/2013 | Kleyman |
| 8,622,312 | B2 | 1/2014 | Norair |
| 8,718,551 | B2 | 5/2014 | Norair |
| 8,774,096 | B2 | 7/2014 | Norair |
| 8,867,370 | B2 | 10/2014 | Norair |
| 8,885,586 | B2 | 11/2014 | Norair |
| 8,909,865 | B2 | 12/2014 | Norair |
| 8,929,961 | B2 | 1/2015 | Norair |
| 8,976,691 | B2 | 3/2015 | Norair |
| 8,976,763 | B2 * | 3/2015 | Shrestha ...................... 370/336 |
| 9,009,048 | B2 | 4/2015 | Jang et al. |
| 9,042,353 | B2 | 5/2015 | Norair |
| 9,104,548 | B2 | 8/2015 | Norair |
| 9,154,392 | B2 | 10/2015 | Norair |
| 2002/0022495 | A1 | 2/2002 | Choi |
| 2002/0025823 | A1 | 2/2002 | Hara |
| 2002/0078045 | A1 | 6/2002 | Dutta |
| 2002/0108045 | A1 | 8/2002 | Wells |
| 2003/0115369 | A1 | 6/2003 | Walter |
| 2003/0128674 | A1 | 7/2003 | Kong |
| 2003/0154243 | A1 | 8/2003 | Crockett |
| 2003/0183691 | A1 | 10/2003 | Lahteenmaki |
| 2004/0157631 | A1 | 8/2004 | Stobart |
| 2004/0218557 | A1 | 11/2004 | Kim et al. |
| 2005/0078038 | A1 | 4/2005 | Takaki |
| 2005/0083943 | A1 | 4/2005 | Lee et al. |
| 2005/0128086 | A1 | 6/2005 | Brown |
| 2005/0135291 | A1 | 6/2005 | Ketchum et al. |
| 2005/0138178 | A1 | 6/2005 | Astarabadi |
| 2005/0139685 | A1 | 6/2005 | Kozlay |
| 2005/0174953 | A1 | 8/2005 | Ho |
| 2005/0177633 | A1 | 8/2005 | Plunkett |
| 2006/0002312 | A1 | 1/2006 | Delattre et al. |
| 2006/0061795 | A1 | 3/2006 | Walmsley |
| 2006/0088021 | A1 | 4/2006 | Nelson et al. |
| 2006/0091223 | A1 | 5/2006 | Zellner |
| 2006/0145817 | A1 | 7/2006 | Aikawa |
| 2006/0165024 | A1 | 7/2006 | Iwami et al. |
| 2006/0175420 | A1 | 8/2006 | Satou |
| 2006/0184860 | A1 | 8/2006 | Takagi |
| 2006/0205343 | A1 | 9/2006 | Runyon |
| 2006/0219776 | A1 | 10/2006 | Finn |
| 2006/0220867 | A1 | 10/2006 | Dixon |
| 2007/0000316 | A1 | 1/2007 | Lauer |
| 2007/0002892 | A1 | 1/2007 | Waxman |
| 2007/0010928 | A1 | 1/2007 | Brusarosco |
| 2007/0026891 | A1 | 2/2007 | Lai |
| 2007/0058661 | A1 | 3/2007 | Chow |
| 2007/0083697 | A1 | 4/2007 | Birrell |
| 2007/0083924 | A1 | 4/2007 | Lu |
| 2007/0099641 | A1 | 5/2007 | Lastinger |
| 2007/0113636 | A1 | 5/2007 | Huang |
| 2007/0125836 | A1 | 6/2007 | McAllister et al. |
| 2007/0136509 | A1 | 6/2007 | Agami |
| 2007/0183366 | A1 | 8/2007 | Park |
| 2007/0211532 | A1 | 9/2007 | Gonzalez |
| 2007/0232281 | A1 | 10/2007 | Nakai |
| 2007/0254619 | A1 | 11/2007 | Salomone et al. |
| 2007/0295074 | A1 | 12/2007 | Kobayakawa |
| 2008/0041936 | A1 | 2/2008 | Vawter |
| 2008/0069097 | A1 | 3/2008 | Motegi |
| 2008/0075123 | A1 | 3/2008 | Fourcand |
| 2008/0107060 | A1 | 5/2008 | Andou et al. |
| 2008/0121687 | A1 | 5/2008 | Buhot |
| 2008/0123683 | A1 | 5/2008 | Cheng |
| 2008/0130597 | A1 | 6/2008 | Kalhan |
| 2008/0164325 | A1 | 7/2008 | Borracci |
| 2008/0172357 | A1 | 7/2008 | Rechis |
| 2008/0186857 | A1 | 8/2008 | Becker |
| 2008/0186867 | A1 | 8/2008 | Shoo et al. |
| 2008/0209322 | A1 | 8/2008 | Kaufman |
| 2008/0219323 | A1 | 9/2008 | Desai |
| 2008/0228592 | A1 | 9/2008 | Kotas |
| 2008/0238621 | A1 | 10/2008 | Rofougaran |
| 2008/0242279 | A1 | 10/2008 | Ramer |
| 2008/0250492 | A1 | 10/2008 | Hazard |
| 2008/0256409 | A1 | 10/2008 | Oran |
| 2008/0279210 | A1 | 11/2008 | Naka |
| 2008/0302177 | A1 | 12/2008 | Sinnett |
| 2008/0320139 | A1 | 12/2008 | Fukuda |
| 2009/0003376 | A1 | 1/2009 | Horvat |
| 2009/0006376 | A1 | 1/2009 | Hendriks |
| 2009/0034491 | A1 | 2/2009 | Adams |
| 2009/0055377 | A1 | 2/2009 | Hedge |
| 2009/0069049 | A1 | 3/2009 | Jain |
| 2009/0073070 | A1 | 3/2009 | Rofougaran |
| 2009/0094501 | A1 | 4/2009 | Jijina |
| 2009/0113267 | A1 | 4/2009 | Harrison |
| 2009/0138948 | A1 | 5/2009 | Calamera |
| 2009/0141531 | A1 | 6/2009 | Abedin |
| 2009/0150646 | A1 | 6/2009 | Allen |
| 2009/0171749 | A1 | 7/2009 | Laruelle |
| 2009/0171947 | A1 | 7/2009 | Karayel |
| 2009/0196279 | A1 | 8/2009 | Kim |

(56) References Cited

U.S. PATENT DOCUMENTS

| | | |
|---|---|---|
| 2009/0210898 A1 | 8/2009 | Childress et al. |
| 2009/0251295 A1 | 10/2009 | Norair |
| 2009/0268674 A1 | 10/2009 | Liu |
| 2009/0279652 A1 | 11/2009 | Sinha |
| 2009/0286496 A1 | 11/2009 | Yavuz et al. |
| 2009/0292418 A1 | 11/2009 | Kuykendal |
| 2010/0011156 A1 | 1/2010 | Yim |
| 2010/0026589 A1 | 2/2010 | Dou |
| 2010/0027558 A1 | 2/2010 | Han |
| 2010/0036806 A1 | 2/2010 | Lam |
| 2010/0052859 A1 | 3/2010 | Lossau |
| 2010/0075612 A1 | 3/2010 | Oi |
| 2010/0078471 A1 | 4/2010 | Lin |
| 2010/0082893 A1 | 4/2010 | Ma |
| 2010/0097946 A1 | 4/2010 | Celentano |
| 2010/0097956 A1 | 4/2010 | Tauil |
| 2010/0097957 A1 | 4/2010 | Pirzada et al. |
| 2010/0118737 A1 | 5/2010 | Kim |
| 2010/0162069 A1 | 6/2010 | Niu |
| 2010/0177696 A1 | 7/2010 | Jung |
| 2010/0179877 A1 | 7/2010 | Lam |
| 2010/0181377 A1 | 7/2010 | Chen |
| 2010/0190437 A1 | 7/2010 | Buhot |
| 2010/0197261 A1 | 8/2010 | Zibrik et al. |
| 2010/0228617 A1 | 9/2010 | Ransom et al. |
| 2010/0232408 A1 | 9/2010 | Lim |
| 2010/0256976 A1 | 10/2010 | Atsmon |
| 2010/0261496 A1 | 10/2010 | Fukumoto |
| 2010/0280904 A1 | 11/2010 | Ahuja |
| 2010/0295681 A1 | 11/2010 | Burns et al. |
| 2010/0303051 A1 | 12/2010 | Umeuchi |
| 2010/0313241 A1 | 12/2010 | Lee |
| 2010/0329131 A1 | 12/2010 | Oyman |
| 2011/0003607 A1 | 1/2011 | Forenza et al. |
| 2011/0007733 A1 | 1/2011 | Kubler et al. |
| 2011/0029370 A1 | 2/2011 | Roeding |
| 2011/0064013 A1 | 3/2011 | Liu |
| 2011/0074552 A1 | 3/2011 | Norair |
| 2011/0099037 A1 | 4/2011 | Levin |
| 2011/0111766 A1 | 5/2011 | Yang |
| 2011/0112892 A1 | 5/2011 | Tarantino |
| 2011/0116513 A1 | 5/2011 | Gilson |
| 2011/0156872 A1 | 6/2011 | Wengrovitz |
| 2011/0158206 A1* | 6/2011 | Shrestha ............... G01D 21/00 370/336 |
| 2011/0191657 A1 | 8/2011 | Bliss |
| 2011/0223937 A1 | 9/2011 | Leppanen |
| 2011/0268024 A1 | 11/2011 | Jamp |
| 2011/0306384 A1 | 12/2011 | Wei |
| 2011/0316716 A1 | 12/2011 | Mackay |
| 2012/0001730 A1 | 1/2012 | Potyrailo |
| 2012/0039265 A1 | 2/2012 | Patel |
| 2012/0059936 A1 | 3/2012 | Bauchot |
| 2012/0086615 A1 | 4/2012 | Norair |
| 2012/0087267 A1 | 4/2012 | Norair |
| 2012/0089370 A1* | 4/2012 | Chebbo ............... A61B 5/0002 702/188 |
| 2012/0092155 A1* | 4/2012 | Abedi ............... H04W 74/0875 340/539.12 |
| 2012/0093151 A1 | 4/2012 | McFarland |
| 2012/0106397 A1* | 5/2012 | Abedi ............... H04W 74/0875 370/255 |
| 2012/0116694 A1 | 5/2012 | Norair |
| 2012/0116887 A1 | 5/2012 | Norair |
| 2012/0136704 A1 | 5/2012 | Carlson |
| 2012/0191848 A1 | 7/2012 | Norair |
| 2012/0201246 A1 | 8/2012 | Fernandez |
| 2012/0209716 A1 | 8/2012 | Burns |
| 2012/0224590 A1 | 9/2012 | Norair |
| 2012/0226822 A1 | 9/2012 | Norair |
| 2012/0226955 A1 | 9/2012 | Norair |
| 2013/0210461 A1 | 8/2013 | Moldavsky |
| 2015/0124628 A1 | 5/2015 | Norair |
| 2015/0146538 A1 | 5/2015 | Norair |

FOREIGN PATENT DOCUMENTS

| | | |
|---|---|---|
| WO | 2006001556 A1 | 1/2006 |
| WO | 2009023592 A2 | 2/2009 |

OTHER PUBLICATIONS

PCT International Searching Authority, Notification Concerning Transmittal of the International Search Report and The Written Opinion of the International Searching Authority, or the Declaration, in International application No. PCT/US11/55082, dated Mar. 1, 2012 (13 pages).

PCT International Searching Authority, Notification Concerning Transmittal of the International Search Report and The Written Opinion of the International Searching Authority, or the Declaration, in International application No. PCT/US11/55934, dated Mar. 6, 2012 (11 pages).

PCT International Searching Authority, Notification Concerning Transmittal of the International Search Report and The Written Opinion of the International Searching Authority, or the Declaration, in International application No. PCT/US2011/055929, dated Jan. 30, 2012. (15 pages).

PCT International Searching Authority, Notification Concerning Transmittal of the International Search Report and The Written Opinion of the International Searching Authority, or the Declaration, in International application No. PCT/US2011/059292, dated Feb. 2, 2012. (12 pages).

PCT International Searching Authority, Notification Concerning Transmittal of the International Search Report and The Written Opinion of the International Searching Authority, or the Declaration, in International application No. PCT/US11/059304, dated Mar. 9, 2012 (11 pages).

PCT International Searching Authority, Notification Concerning Transmittal of the International Search Report and The Written Opinion of the International Searching Authority, or the Declaration, in International application No. PCT/US2011/060950, dated Mar. 16, 2012. (14 pages).

PCT International Searching Authority, Notification Concerning Transmittal of the International Search Report and The Written Opinion of the International Searching Authority, or the Declaration, in International application No. PCT/US12/22005, dated Mar. 29, 2012. (12 pages).

PCT International Searching Authority, Notification Concerning Transmittal of the International Search Report and The Written Opinion of the International Searching Authority, or the Declaration, in International application No. PCT/US12/22002, dated May 8, 2012. (13 pages).

PCT International Searching Authority, Notification Concerning Transmittal of the International Search Report and The Written Opinion of the International Searching Authority, or the Declaration, in International application No. PCT/US2012/025191 dated May 25, 2012 (8 pages).

PCT International Searching Authority, Notification Concerning Transmittal of the International Search Report and The Written Opinion of the International Searching Authority, or the Declaration, in International application No. PCT/US2012/025197 dated May 25, 2012 (7 pages).

PCT International Searching Authority, Notification Concerning Transmittal of the International Search Report and The Written Opinion of the International Searching Authority, or the Declaration, in International application No. PCT/US2012/027382 dated May 31, 2012 (10 pages).

PCT International Searching Authority, Notification Concerning Transmittal of the International Search Report and The Written Opinion of the International Searching Authority, or the Declaration, in International application No. PCT/US2012/027381 dated May 31, 2012 (13 pages).

PCT International Searching Authority, Notification Concerning Transmittal of the International Search Report and The Written Opinion of the International Searching Authority, or the Declaration, in International application No. PCT/US2012/027387 dated Jun. 6, 2012 (14 pages).

(56) References Cited

OTHER PUBLICATIONS

PCT International Searching Authority, Notification Concerning Transmittal of the International Search Report and The Written Opinion of the International Searching Authority, or the Declaration, in International application No. PCT/US2012/27378 dated Jun. 13, 2012 (14 pages).

PCT International Searching Authority, Notification Concerning Transmittal of the International Search Report and The Written Opinion of the International Searching Authority, or the Declaration, in International application No. PCT/US2012/027379 dated Jun. 20, 2012 (16 pages).

PCT International Searching Authority, Notification Concerning Transmittal of the International Search Report and The Written Opinion of the International Searching Authority, or the Declaration, in International application No. PCT/US2012/027384 dated Jun. 20, 2012 (10 pages).

PCT International Searching Authority, Notification Concerning Transmittal of the International Search Report and The Written Opinion of the International Searching Authority, or the Declaration, in International application No. PCT/US2012/046894 dated Sep. 27, 2012.

PCT International Searching Authority, Notification Concerning Transmittal of the Int'l Search Report and The Written Opinion of the Int'l Searching Authority or the Declaration in Int'l application No. PCT/US2012/027386 dated Oct. 16, 2012.

Norair JP (2009). Introduction to DASH7 Technologies 1 st Edition. Whitepaper. Mar. 16, 2009, 1-22.

Richard MacManus. DASH7: Bringing Sensor Networking to Smartphones. readwrite.com. Apr. 11, 2010. pp. 1-5.

"Mapping IP Multicast to MAC-Layer Multicast" TechNet Microsoft Library (1 page).

Popovski, P. et al. "Device Discovery in Short Range Wireless Ad Hoc Networks," 5th Intl Symposium on Wireless Personal Multimedia Communications, vol. 3, Oct. 2002, pp. 27-30.

* cited by examiner

METHOD AND APPARATUS FOR LOW-POWER, LONG-RANGE NETWORKING

CLAIM OF PRIORITY

This patent application is a continuation of U.S. application Ser. No. 13/267,621 now U.S. Pat. No. 9,042,353, which makes reference to, claims priority to and claims benefit from U.S. Provisional Patent Application Ser. No. 61/404,541 filed on Oct. 6, 2010.

The above stated application is hereby incorporated herein by reference in its entirety.

INCORPORATION BY REFERENCE

This patent application also makes reference to:
U.S. Provisional Patent Application Ser. No. 61/464,376 filed on Mar. 2, 2011.

Each of the above stated applications is hereby incorporated herein by reference in its entirety.

FIELD OF THE INVENTION

Certain embodiments of the invention relate to networking. More specifically, certain embodiments of the invention relate to a method and apparatus for low-power, long-range networking.

BACKGROUND OF THE INVENTION

Existing wireless networks consume too much power and/or are too-limited in terms of range. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for low-power, long-range networking, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". For example, "x and/or y" means any element of the three-element set $\{(x), (y), (x, y)\}$. Similarly, "x, y, and/or z" means any element of the seven-element set $\{(x), (y), (z), (x, y), (x, z), (y, z), (x, y, z)\}$. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the term "e.g.," introduces a list of one or more non-limiting examples, instances, or illustrations.

Figure 1:
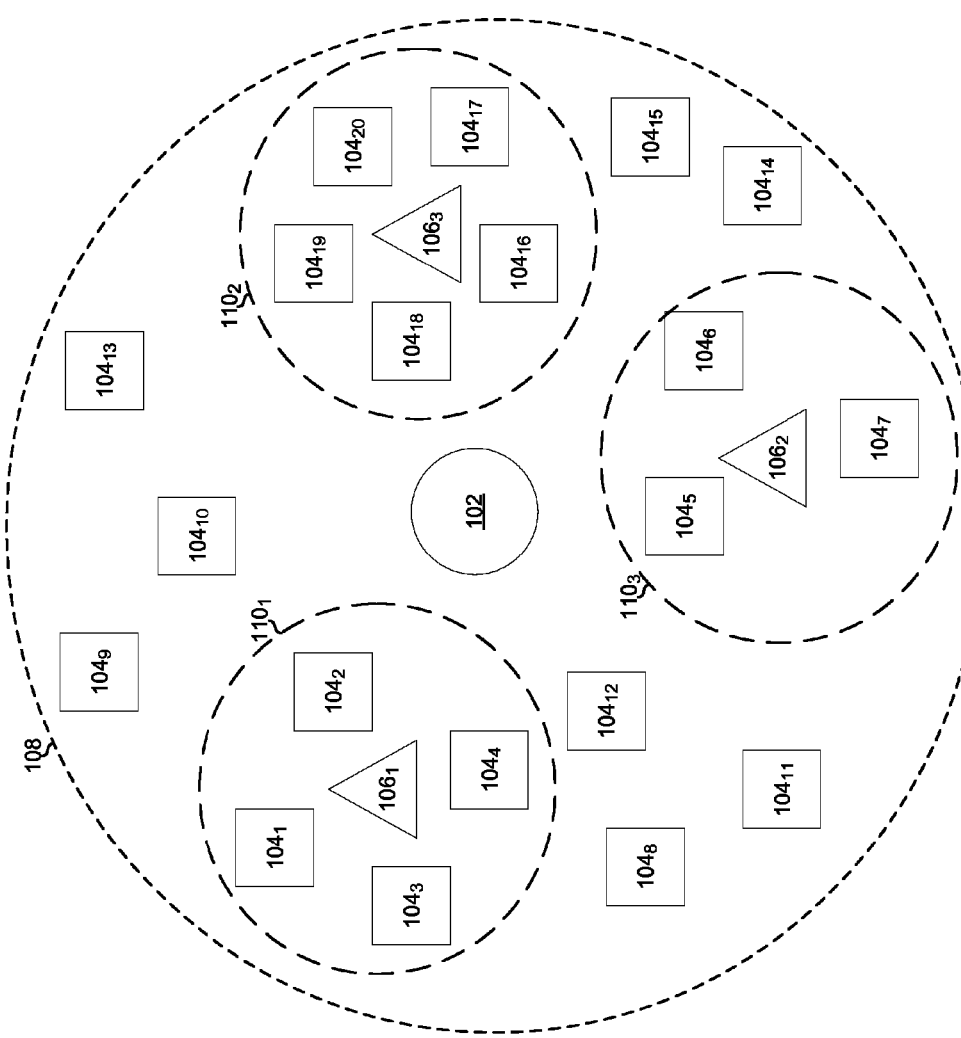
FIG. 1 depicts an exemplary wireless communication network.

FIG. 1 depicts an exemplary wireless communication network. Shown is a cell 108 associated with a base station 102. Within the cell are controllers $106_1$-$106_3$ and endpoints $104_1$-$104_{20}$.

The base station 102 may comprise circuitry for communicating wirelessly, and managing overall synchronization and access to the wireless network within the cell 108. The base station 102 may transmit and receive wireless signals in accordance with any one or more protocols. Such protocols may include, for example, protocols defined in the ISO 18000-7 standard, and/or protocols described in the above-incorporated U.S. Provisional Patent Application No. 61/464,376 filed on Mar. 2, 2011. In an embodiment of the invention, the base station 102 may communicate with the controllers $106_1$-$106_3$ utilizing a first one or more protocols, and communicate with the endpoints $104_1$-$104_{20}$ utilizing a second one or more protocols. An exemplary base station is described below with respect to FIG. 2.

Each of the controllers $106_1$-$106_3$ may comprise circuitry for communicating wirelessly with one or more endpoints that are within the coverage area of the controller (i.e., "in-range endpoints"). In FIG. 1, endpoints $104_1$-$104_4$ are within the coverage area $110_1$ of the controller $106_1$, endpoints $104_5$-$104_7$ are within the coverage area $110_2$ of the controller $106_2$, and endpoints $104_{16}$-$104_{20}$ are within the coverage area $110_3$ of controller $106_3$. Each of the controllers $106_1$-$106_3$ may communicate with in-range endpoints in accordance with any one or more protocols. Such protocols may include, for example, protocols defined in the ISO 18000-7 standard, and/or protocols described in the above-incorporated U.S. Provisional Patent Application No. 61/464,376 filed on Mar. 2, 2011. An exemplary controller 106 is described below with respect to FIG. 2.

Each of the endpoints $104_1$-$104_{20}$ may comprise circuitry for communicating wirelessly. Each of the controllers $106_1$-$106_3$ may communicate with in-range endpoints in accordance with any one or more protocols. Such protocols may include, for example, protocols defined in the ISO 18000-7 standard, and/or protocols described in the above-incorporated U.S. Provisional Patent Application No. 61/464,376 filed on Mar. 2, 2011. An exemplary endpoint 104 is described below with respect to FIG. 2.

In an embodiment of the invention, access to one or more channels in the airspace within the cell 108 may be time-division multiplexed into a plurality of windows. In an exemplary windowing scheme, there may be three windows which cyclically repeat. A first of the windows may be utilized for endpoints to transmit connectionless beacons which may be received by the base station 102, the controllers $106_1$-$106_3$, and/or other endpoints. A second window may be utilized for endpoints to transmit connectionless alarm signals which may be received by the base station 102. A third window may be an open-access window in which bidirectional communications between the base station 102 and the controllers $106_1$-$106_3$, bidirectional communications between the controllers $106_1$-$106_3$ and the endpoints $104_1$-$104_{20}$, and/or bidirectional communications among endpoints $104_1$-$104_{20}$ may take place. Additional details of such an exemplary windowing scheme are described below with respect to FIGS. 3A-3C.

Beacons transmitted by the endpoints $104_1$-$104_{20}$ during assigned timeslots may be utilized by the base station 102 and/or the controllers $106_1$-$106_3$ to detect and/or verify the presence and/or status of the devices $104_1$-$104_{20}$. Alarm signals transmitted by the endpoints during an alarm window may alert network administrators that the endpoint which transmitted an alarm signal has detected a condition that needs to be addressed.

During an open access window, bidirectional communications between the endpoints $104_1$-$104_{20}$ and controllers $106_1$-$106_3$ and/or the base station 102 may configure the endpoints $104_1$-$104_{20}$ (which may include resynchronizing the endpoints $104_1$-$104_{20}$ to a network clock), upload data from the endpoints $104_1$-$104_{20}$, and/or download data to the endpoints $104_1$-$104_{20}$. Similarly, in some instances, bidirectional communications among two or more of the endpoints $104_1$-$104_{20}$ may take place during an open-access window. Such communication among endpoints may be utilized for synchronizing the local clocks of the endpoints $104_1$-$104_{20}$ and/or transferring data among the endpoints $104_1$-$104_{20}$.

The beacon signals and alarm signals may be transmitted utilizing different protocols than those utilized for signals communicated as part of bidirectional communications during the open-access window(s). Accordingly, packets transmitted during the open-access window may be, e.g., formatted differently, encoded differently, transmitted on different frequencies, and/or transmitted utilizing different modulation than the beacon signals and alarm signals transmitted during other windows.

Figure 2:
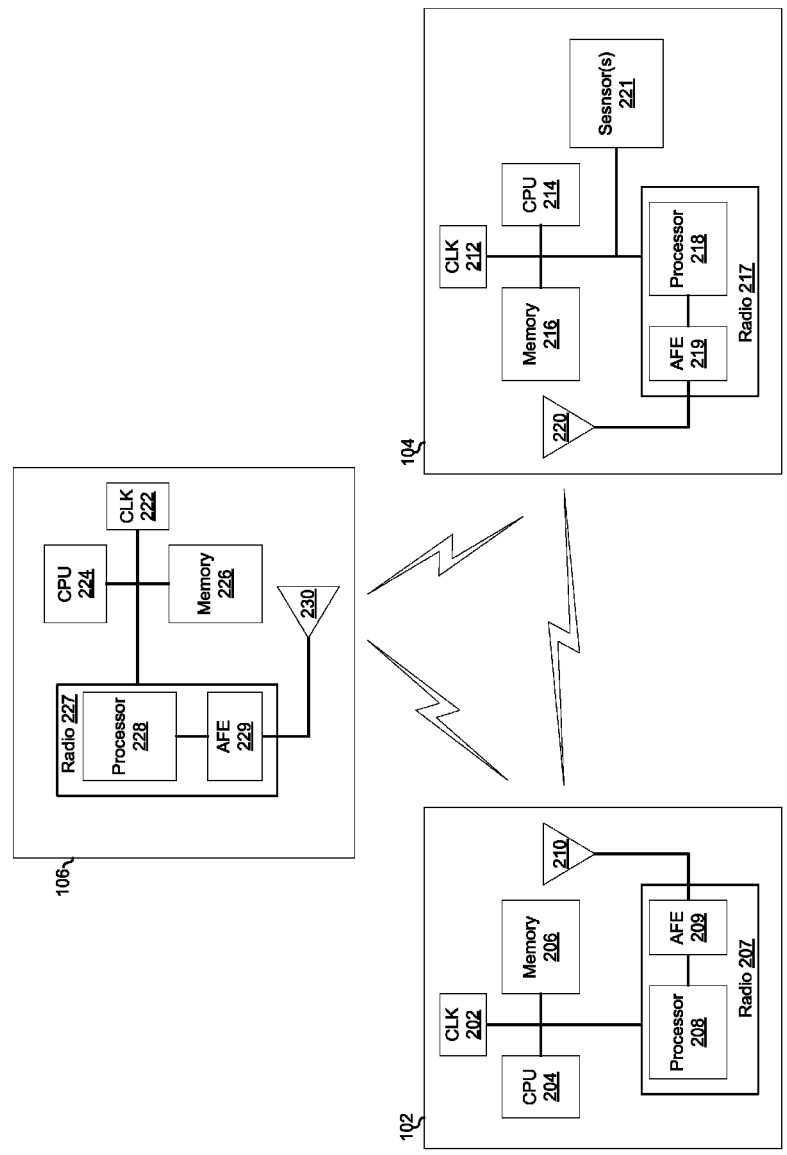
FIG. 2 depicts an exemplary low-power, long-range network endpoint.

FIG. 2 depicts an exemplary low-power, long-range network endpoint. Shown in FIG. 2 are an exemplary base station 102 and an exemplary endpoint 104, which may correspond to any of the devices $104_1$-$104_{20}$ of FIG. 1. The exemplary base station 102 comprises a clock 202, CPU 204, a memory 206, a radio 207, and an antenna 210. The exemplary controller 106 comprises a clock 224, CPU 224, a memory 226, a radio 227, and an antenna 230. The exemplary endpoint 104 comprises a clock 204, CPU 214, a memory 216, a radio 217, an antenna 220, and one or more sensors 221. In an exemplary embodiment of the invention, the base station 102 may be relatively more complex than the controller 106 which, in turn, may be relatively more-complex than the endpoint 104. Accordingly, the base station 102 may comprise more-expensive components than the controller 106 which, in turn, may comprise more-expensive components than the endpoint 104.

The clock 202 may comprise an oscillator which generates a periodic signal and/or may comprise a date/time clock. The clock 202 may provide a reference for synchronous circuitry of the base station 102. The clock 202 may provide the network clock for a network controlled by the base station 102.

The clock 212 may comprise an oscillator which generates a periodic signal and/or may comprise a date/time clock. The clock 212 may be a local clock that provides a time reference for synchronous circuitry of the device 104. In instances that the device 104 is resource-constrained, the clock 212 may be less complex than the clock 202. Consequently, the clock 212 may be relatively inaccurate/less-stable compared to the clock 202 (e.g., may exhibit relatively significant drift over relatively short periods of time). Accordingly, the local clock 212 may occasionally need to be resynchronized to the network clock 202.

The clock 222 may comprise an oscillator which generates a periodic signal and/or may comprise a date/time clock. The clock 222 may be a local clock that provides a time reference for synchronous circuitry of the device 106. In an exemplary embodiment of the invention, the clock 222 may be relatively less accurate/stable than the clock 202 but more accurate/stable than the clock 212.

The CPU 204 may comprise circuitry operable to control operation of the base station 102. The CPU 204 may, for example, execute an operating system and/or other programs. The CPU 204 may generate one or more control signals for controlling the operation of the base station 102. The CPU 204 may, for example, control a mode of operation of the base station 102.

The CPU 214 may comprise circuitry operable to control operation of the second device 104. In some instances, the CPU 214 may be substantially similar to the CPU 204. In instances that the device 104 is resource-constrained, the CPU 204 may be less-complex (e.g., comprise fewer gates, utilize less power, utilize less memory, etc.) than the CPU 214. In one embodiment, for example, the CPU 204 may comprise a RISC or ARM processor, and the CPU 214 may comprise a state-machine having a relatively small number of states (e.g., four states).

The CPU 224 may comprise circuitry operable to control operation of the controller 106. In some instances, the CPU 224 may be substantially similar to the CPU 204. In those or other instances, the CPU 224 may be less-complex than the CPU 204 but more complex than the CPU 214.

The radio 207 may comprise a processor 208 and an analog front-end (AFE) 209. The processor 208 may comprise circuitry operable to interface with the AFE 209 to receive and transmit data, and to process received and to-be-transmitted data. For transmission, the processor 208 may be operable to receive data from the CPU 204 and/or memory 206, packetize and/or otherwise process the data to prepare it for transmission in accordance with one or more wireless protocols, and output the data to the AFE 209 for transmission. For reception, the processor 208 may be operable to receive data via the AFE 209, process the received data and output received data to the memory 206 and/or the CPU 204. Exemplary protocols which may be supported by the radio 207 include the ISO 18000-7 standard, and protocols described in the above-incorporated U.S. Provisional Patent Application No. 61/464, 376 filed on Mar. 2, 2011.

The radio 217 may comprise a processor 218 and an analog front-end (AFE) 219. The processor 218 may comprise circuitry operable to interface with the AFE 219 to receive and transmit data, and to process received and to-be-transmitted data. In some instances, the processor 218 may be substantially similar to the processor 208. In instances that the device 104 is resource-constrained, the processor 218 may be less-complex (e.g., comprise fewer gates, utilize less power, utilize less memory, etc.) than the processor 208. In one embodiment, for example, the processor 208 may be operable to implement more complex signal processing algorithms than the processor 218.

The radio 227 may comprise a processor 228 and an analog front-end (AFE) 229. The processor 228 may comprise circuitry operable to interface with the AFE 229 to receive and transmit data, and to process received and to-be-transmitted data. In some instances, the processor 228 may be substantially similar to the processor 208. In those or other instances the processor 228 may be less-complex than the processor 208 but more-complex than the processor 218.

The analog front-end (AFE) 209 may comprise circuitry suitable for processing received and/or to-be-transmitted data in the analog domain. For transmission, the AFE 209 may receive digital data from the processor 208, process the data to generate corresponding RF signals, and output the RF signals to the antenna 210. For reception, the AFE 209 may receive RF signals from the antenna 210, process the RF signals to generate corresponding digital data, and output the digital data to the processor 208.

The AFE 219 may comprise circuitry suitable for processing received and/or to-be-transmitted data in the analog domain. In some instances, the AFE 219 may be substantially similar to the AFE 209. In instances that the device 104 is resource-constrained, the AFE 219 may be less-complex (e.g., comprise fewer gates, utilize less power, utilize less memory, etc.) than the AFE 209. In one embodiment, for example, the AFE 209 may comprise a more-sensitive receiver, and a more powerful transmitter than the AFE 219.

The AFE 229 may comprise circuitry suitable for processing received and/or to-be-transmitted data in the analog domain. In some instances, the AFE 229 may be substantially similar to the AFE 209. In those or other instances the AFE 229 may be less-complex than the AFE 209 but more-complex than the AFE 219.

Circuitry of the memory 206 may comprise one or more memory cells and may be operable to store data to the memory cell(s) and read data from the memory cell(s). The one or more memory cell may comprise one or more volatile memory cells and/or one or more non-volatile memory cells.

Circuitry of the memory 216 may comprise one or more memory cells and may be operable to read data from the memory cell(s) and/or store data to the memory cell(s). In some instances, the memory 216 may be substantially similar to the memory 206. In instances that the device 104 is resource-constrained, the memory 216 may be less-complex (e.g., comprise fewer gates, utilize less power, etc.) than the memory 206.

Circuitry of the memory 226 may comprise one or more memory cells and may be operable to read data from the memory cell(s) and/or store data to the memory cell(s). In some instances, the memory 226 may be substantially similar to the memory 206. In those or other instances the memory 226 may be less-complex than the memory 206 but more-complex than the memory 216.

Each of the antennas 210, 220, and 230 may be operable to transmit and receive electromagnetic signals in one or more frequency bands. In an embodiment of the invention, the antennas 210 and 220 may be operable to transmit and receive signals in the ISM frequency band centered at 433.92 MHz.

The sensor(s) 221 may comprise one or more of: an acoustic sensor operable to sense, e.g., amplitude, phase, polarization, spectrum and/or wave velocity of acoustic waves; a chemical operable to sense, e.g., the presence of any one or more elements and/or compounds in solid, gas, and/or liquid form; an electrical sensor operable to detect, e.g., amplitude, phase, polarization, and/or spectrum of a current and/or voltage, conductivity, and/or permittivity; a magnetic sensor operable to, e.g., detect flux, permeability, amplitude, phase, and/or polarization of a magnetic field; a mechanical sensor operable to detect, e.g., position, acceleration, force, stress, pressure, strain, mass, density, moment, torque, shape, roughness, orientation, and/or stiffness; an optical sensor operable to detect, e.g., amplitude, phase, polarization, and/or spectrum of an optical wave, wave velocity, refractive index, emissivity, reflectivity, and/or absorption; and/or a thermal sensor operable to detect, e.g., temperature, flux, specific heat, and/or thermal conductivity. The sensor(s) 221 may, for example, generate an interrupt to the CPU 214 when an alarm condition is present.

In operation, prior to a device 104 joining the network managed by the base station 102, the device 104 may listen for network parameters from the base station 102. Such parameters may, for example, be transmitted onto a predetermined control channel by the base station 102. Additionally or alternatively, an administrator of the device 104 may, for example, manually program parameters into the device 104 and/or download parameters to the device 104 (e.g., via a wired connection to the base station 102, and/or the Internet and/or a LAN). The parameters configured in the device 104 may include one or more parameters for synchronizing the clock 212 to the clock 202. The parameters configured in the device 104 may include one or more parameters which identify a timeslot to which the device 104 has been assigned. The device 104 may then proceed to normal operation.

In an exemplary embodiment of the invention, normal operation may comprise the device 104 occasionally and/or periodically receiving signals transmitted from the base station 102 and/or one or more other devices 104, occasionally and/or periodically listening to transmissions between other devices and utilizing those transmissions to adjust its clock 212, transmitting connectionless beacon signals during the timeslot assigned to the device 104, and participating in connection-oriented communications during an open-access time window. Normal operation may also comprise monitoring, via the sensor(s) 221 for an alarm condition. When an alarm condition is present, the device 104 may enter an alarm-mode of operation. An alarm-mode of operation may comprise, for example, determining a timeslot of an alarm window during which an alarm signal may be transmitted, and then transmitting the alarm signal during that timeslot.

Figure 3A:
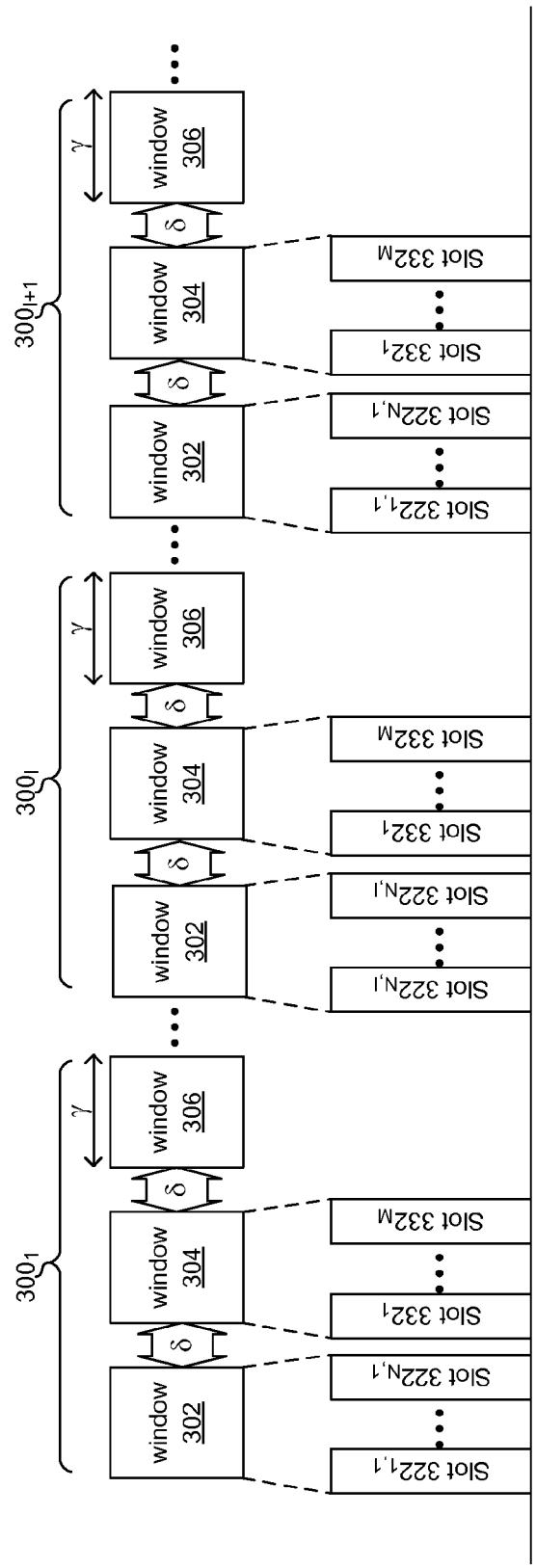
FIG. 3A depicts a plurality of access windows of a network for which access is time-division multiplexed.

FIG. 3A depicts a plurality of access windows of a network for which access is time-division multiplexed. In FIG. 3A, access to the medium is time-division multiplexed into three repeating windows 302, 304, and 306. Shown are I+1 instances 300 of the windows 302, 304, and 306, where I is an integer. The windows 302, 304, and 306 may be separated by idle time having duration δ, where δ, may be configurable and/or implementation-specific. For illustration, it is assumed that there are D endpoints 104 which communicate over the time-division multiplexed medium, where D is an integer.

Each instance of window 302 may be time-division multiplexed into a plurality of timeslots 322. Any particular timeslot 322 is represented herein as $322_{n,i}$, where i is the instance of the window 302, n is the index of the timeslot within the window instance i, $1 \geq i \geq I$, $1 \geq n \geq N$, and n, N, i, and I are integers. The index n wrap to 1 after reaching N, and the index i wraps to 1 after reaching I.

One or more timeslots $322_{1,1}$-$322_{N,I}$ may be assigned to each of one or more endpoints $104_1$-$104_J$. In an embodiment of the invention, each device $104_j$ (where j is an integer between 1 and J, inclusive) is assigned to one timeslot $322_{n,i}$. If the number of devices, J, is greater than N (the number of timeslots 322 that fit into a single instance of the window 302), then it may take multiple instances of the window 302 for a particular endpoint's assigned timeslot to occur. That is, I=ceiling(J/N), where "ceiling( )" denotes rounding up to the next integer. To illustrate, if N=10, and J=12, then I=2, and the sequence of windows may be as follows: a first instance of window 302 corresponding to timeslots $322_{1,1}$-$322_{N,1}$, a window 304, a window 306, a second instance of window 302 corresponding to timeslots $322_{1,2}$-$322_{N,2}$, a window 304, a window 306, a second instance of window 302 corresponding to timeslots $322_{1,1}$-$322_{N,1}$, and so on.

Each instance of window 304 may be time-division multiplexed into timeslots $332_1$-$332_M$, where M is an integer. In an embodiment of the invention, the endpoints $104_1$-$104_{20}$, the controllers $106_1$-$106_3$, and the base station 102 may be prohibited from transmitting during the window 304 unless they are experiencing an alarm condition or have experienced an alarm condition during a pertinent time period, where the pertinent time period may be configurable and/or implementation-specific.

In an embodiment of the invention, each of the timeslots $332_1$-$332_M$ may not be reserved for any particular endpoint 104 but may be available for use by any endpoint 104 that is currently experiencing an alarm condition. An endpoint 104 which has experienced an alarm condition during the pertinent time period may determine which of the timeslots $332_1$-$332_M$ of the window 304 to utilize for transmitting an alarm signal based on which of the timeslots $322_{1,1}$-$322_{N,I}$ the endpoint 104 has been assigned, and on a hash function. In this regard, use of the hash function may enable J endpoints to share M timeslots, even where M is less than J. That is, use of a hash function may take advantage of the fact that, statistically speaking, only a certain percentage of the J endpoints will detect an alarm condition at any given time. Therefore, J endpoints can effectively share M timeslots while the risk that there will be more than M devices detecting an alarm condition during any given time period can be kept below a desired threshold, which may be configurable and/or implementation-specific.

Figure 3B:
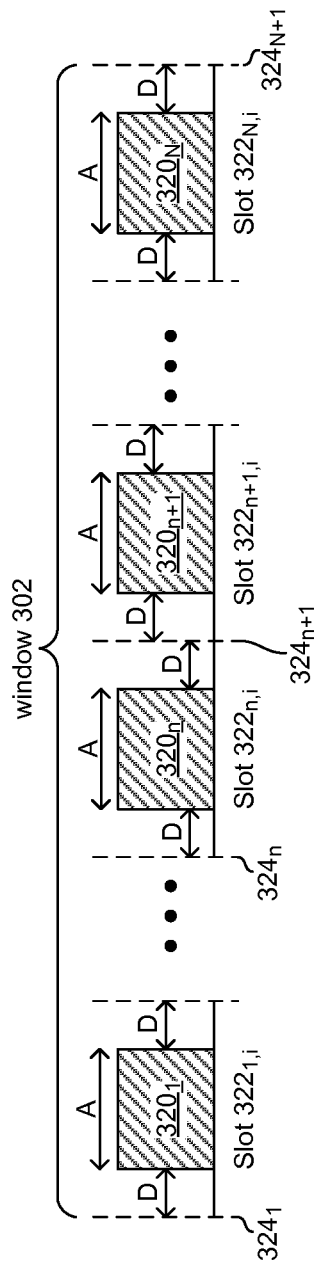
FIG. 3B depicts a window of time which is time-division multiplexed into a plurality of timeslots.

FIG. 3B depicts a window of time which is time-division multiplexed into a plurality of timeslots. Shown in FIG. 3B is an instance, i, of the window 302 described with respect to FIG. 3A. The window 302 is time-division multiplexed into slots $322_{1,i}$-$322_{N,i}$. In an embodiment of the invention, each timeslot $322_{n,i}$ comprises idle time D on either side of a packet time A. Thus, in such an embodiment, each timeslot $322_{n,i}$ is of duration A+2D. In an embodiment of the invention, the value of one or more of A and D, and/or the unit of measurement of A and/or D may be configurable and/or implementation-specific. Time instants, referenced to the network clock 202, and corresponding to boundaries between timeslots, are labeled as time instants $324_1$-$324_{N+1}$. In FIG. 3B, a packet 320 of a beacon signal is transmitted during each of the timeslots $322_{1,i}$-$322_{N,i}$. In an exemplary embodiment of the invention, a beacon signal may be only one packet in length.

Figure 3C:
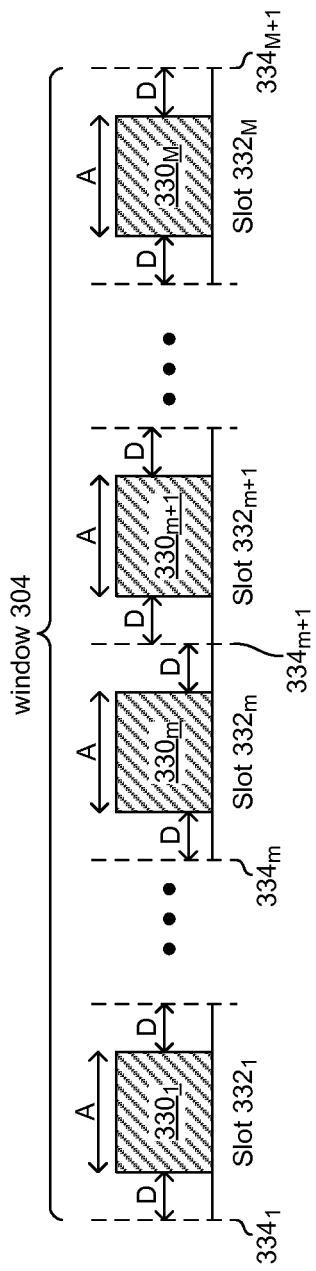
FIG. 3C depicts a window of time which is time-division multiplexed into a plurality of timeslots.

FIG. 3C depicts a window of time which is time-division multiplexed into a plurality of timeslots. Shown in FIG. 3C is an instance of the window 304 described with respect to FIG. 3A. The window 304 is time-division multiplexed into slots $332_1$-$332_M$. In an embodiment of the invention, each timeslot $332_m$, where m is an integer between 1 and M, inclusive, comprises idle time D on either side of a packet time A. Thus, in such an embodiment, each timeslot $332_m$ is of duration A+2D. In an embodiment of the invention, each timeslot $322_{n,i}$ comprises idle time D on either side of a packet time A. Thus, in such an embodiment, each timeslot $322_{n,i}$ is of duration A+2D. In an embodiment of the invention, the value of one or more of A and D, and/or the unit of measurement of A and/or D may be configurable and/or implementation-specific. Time instants, referenced to the network clock 202, and corresponding to boundaries between timeslots, are labeled as time instants $334_1$-$334_{M+1}$. In FIG. 3C, a packet 330 of an alarm signal is transmitted during each of the timeslots $332_1$-$332_M$. In an exemplary embodiment of the invention, a beacon signal may be only one packet in length.

Figure 4:
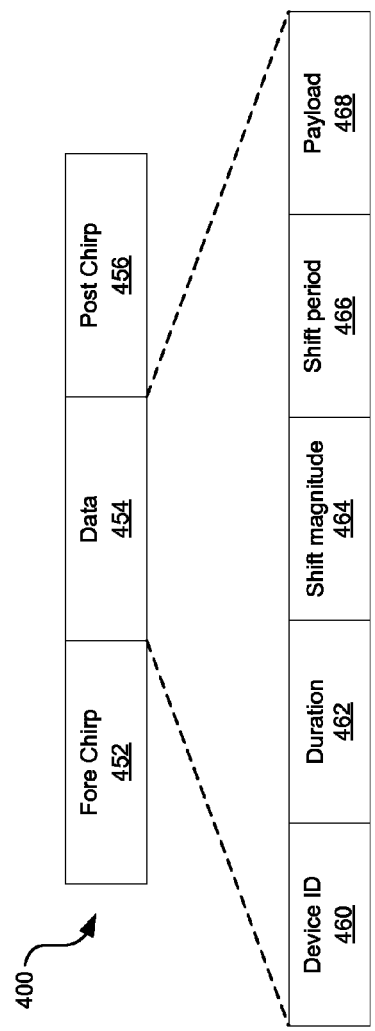
FIG. 4 illustrates an exemplary packet structure utilized for a low-power, long range wireless network.

FIG. 4 illustrates an exemplary packet structure utilized for a low-power, long range wireless network. The structure of the packet 400 depicted in FIG. 4 may be utilized for beacon packets 320 and/or for adjusting the local clock 212 of one or more endpoints 104. The packet 400 comprises a fore chirp 452, a data portion 454, and a post chirp 456. The data portion 454 may, in turn, comprise a device ID field 460, a duration field 462, a shift magnitude field, a shift period field, and a payload 468.

Each of the fore chirp 452 and the post chirp 456 may comprise a sequence of two or more bits with high autocorrelation properties which may be used as a reference for measuring duration. The fore chirp 452 may be different than the post chirp 456 such that an endpoint can distinguish between the two.

The device ID field 460 may comprise a number and/or string that is/are uniquely associated with the endpoint 104 that generated the packet 400.

The duration field 462 may comprise a numeric value corresponding to the amount of time since the last time point at which the endpoint identified by the device ID field 460 had been assigned a timeslot $322_{n,i}$. The unit of measurement of the duration field 462 can may be configurable and/or implementation specific.

The shift magnitude field 464 may comprise a numeric value indicating the magnitude of one or more adjustments of the clock 212 of the endpoint which generated the packet 400. In an embodiment of the invention, the shift magnitude field 464 may indicate the magnitude of a most-recent adjustment and/or an average value of a plurality of adjustments of the clock 212. In an embodiment of the invention, the shift magnitude field 464 may be a signed number. The unit of measurement of the shift magnitude field 464 may be configurable and/or implementation-specific.

The shift period field 466 may comprise a numeric value indicating a number of instances of the window 302 between successive adjustments of the clock 212 of the endpoint which generated the packet 400. In an embodiment of the invention, the shift period field 466 may indicate the number of window instances between the last two clock adjustment and/or an average number of windows between adjustments over multiple adjustments. The unit of measurement of the shift period field 466 may be configurable and/or implementation-specific.

The payload 468 may comprise device, application, and/or implementation specific data.

Figure 5:
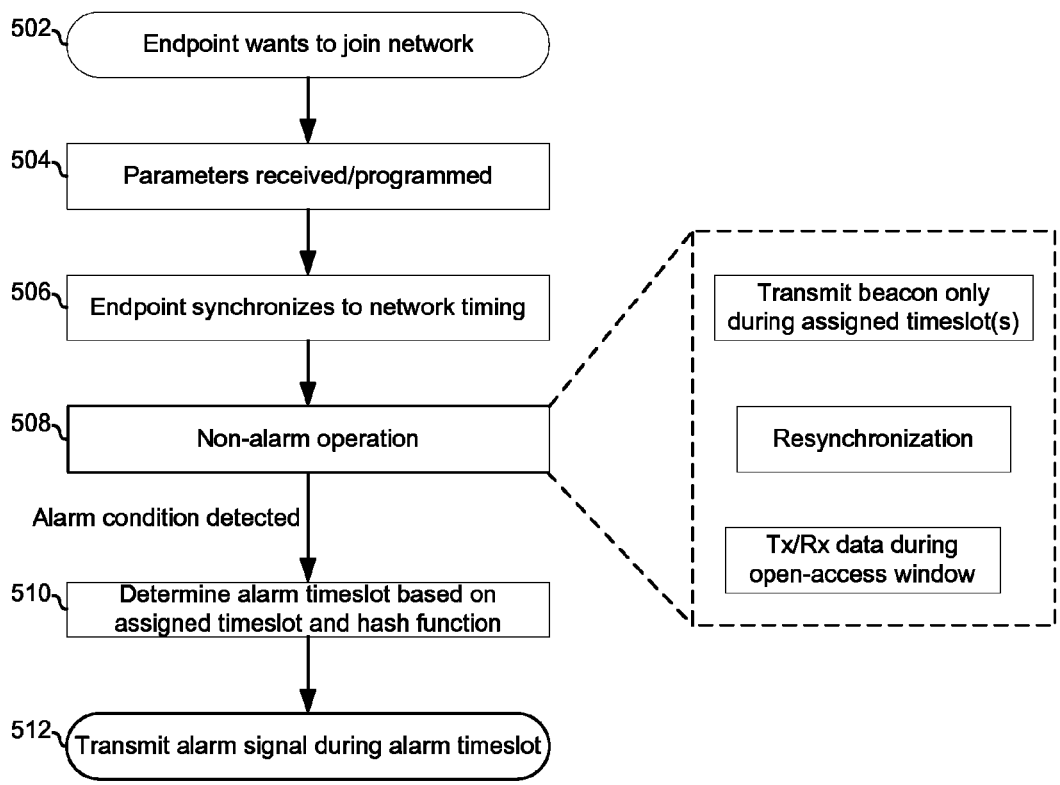
FIG. 5 is a flowchart comprising exemplary steps performed by an endpoint in a low-power, long-range network.

FIG. 5 is a flowchart comprising exemplary steps performed by an endpoint in a low-power, long-range network.

In step 502, an endpoint 104 desires to join the network cell 108 managed by the base station 102.

In step 504, the endpoint 104 may receive and/or be programmed with the necessary parameters. These parameter may include, for example: clock synchronization information; the number of timeslots, N, that fit into a window 302; the number, J, of devices 104 in the cell; the number, I, of iterations of window 302 that are needed to accommodate the J devices in the cell 108; a hash function utilized for selecting which of the timeslots 332 during which to transmit an alarm signal; the packet duration A; the idle time D; the idle time, d, between windows; and/or the duration, γ, of the open-access window 306.

In step 506, the endpoint 104 may adjust its clock 212 to synchronize to the network clock 202.

In step 508, the endpoint 104 may enter a non-alarm mode of operation. While in the non-alarm mode (i.e., while an alarm condition is not present), the endpoint 104 may transmit beacon packets only during its assigned timeslot $322_{n,i}$, the endpoint 104 may periodically and/or occasionally adjust its clock to maintain synchronization with network timing, and/or may communicate with a controller 106 and/or other endpoint 104 during the open-access window 306. Upon the endpoint 104 detecting an alarm condition, the exemplary steps may advance to step 510.

In step 510, the endpoint 104 may determine which of the timeslots of window 304 to utilize for transmitting an alarm signal. The determination may be made by inputting an identifier (e.g., the indices n and i) of the endpoint's assigned timeslot $322_{n,i}$ to a hash algorithm.

In step 512, the endpoint 104 may transmit the alarm signal during the determined timeslot of window 304.

Figure 6:
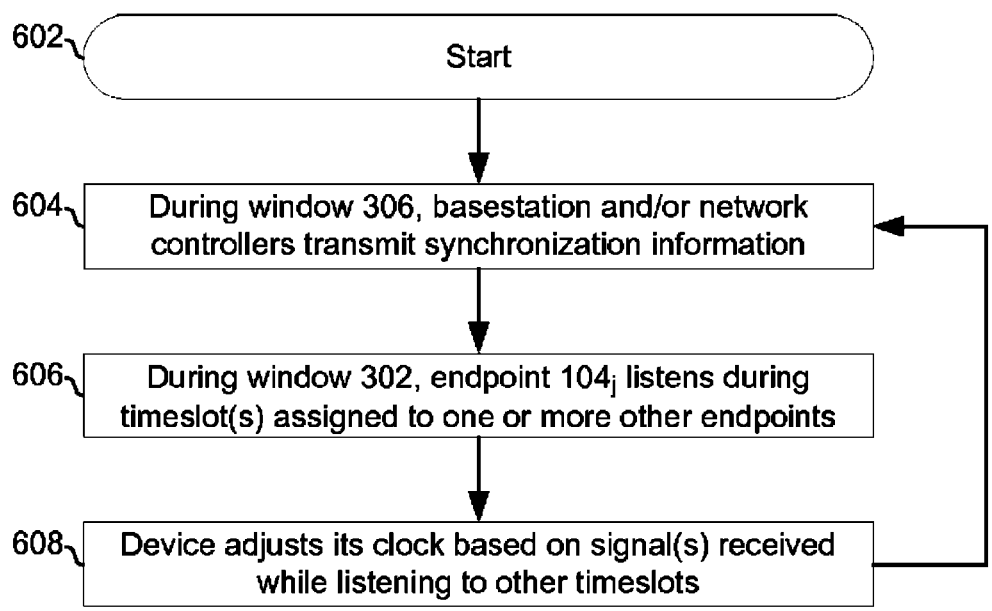
FIG. 6 is a flowchart comprising exemplary steps for synchronization of a low-power, long-range network endpoint.

FIG. 6 is a flowchart comprising exemplary steps for synchronization of a low-power, long-range network endpoint. In step 604, after start step 602, during an instance of the open-access window 306, the base station 102 and/or the controllers $106_1$-$106_3$ may transmit (e.g., broadcast) synchronization for the endpoints $104_1$-$104_{20}$ to utilize in synchronizing their local clocks 212 to the clock 202. In step 606, during an instance of the window 302, endpoint $104_{20}$ may listen during one or more timeslots 322 to which it is not assigned. That is, it may receive beacons transmitted by one or more of the endpoints $104_2$-$104_{19}$. In step 608, the endpoint may adjust its clock 212 based on the beacons received from the other endpoints. After step 608, the steps may return to step 604.

Figure 7:
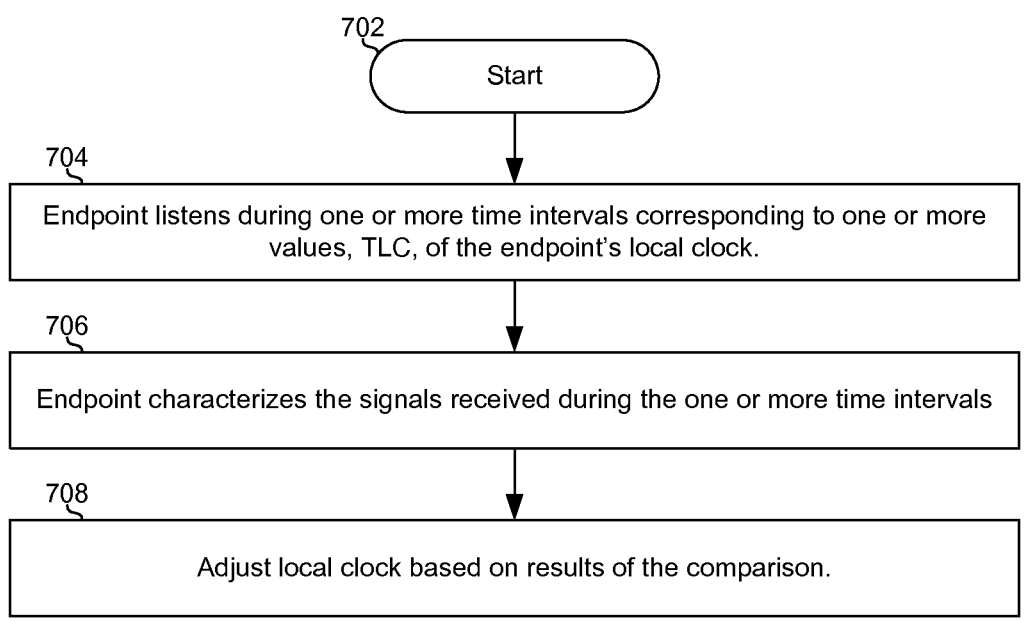
FIG. 7 is a flowchart comprising exemplary steps for synchronization of a low-power, long-range network endpoint.

FIG. 7 is a flowchart comprising exemplary steps for synchronization of a low-power, long-range network endpoint. In step 704, after start step 702, endpoint $104_j$ may listen to a channel of the network cell 108 during a time interval beginning at $T_{LC}$-D and ending at time instant $T_{LC}$+D, where D is the idle time between the end of a first packet (e.g., packet $320_n$ in FIG. 3B) and a timeslot boundary (e.g., timeslot boundary $324_{n+1}$ of FIG. 3B), D is also the idle time between the timeslot boundary and the beginning of a second packet (e.g., packet $320_{n+1}$ in FIG. 3B), and $T_{LC}$ is a value of the local clock 212 of device $104_j$ that is supposed to correspond to the timeslot boundary (That is, if clock 212 is accurately synchronized to the clock 202, then $T_{LC}$ aligns with the timeslot boundary). The endpoint $104_j$ may do this for one or more values of $T_{LC}$.

In step 706, the endpoint may characterize the signals received during the one or more time intervals. In step 708, the endpoint $104_j$ may adjust its clock based on the result of the characterization in step 706.

In an exemplary embodiment, the characterization may comprise determining a ratio of (i) post-chirp bits, bytes, or symbols received during the one or more time intervals to (ii) fore-chirp bits, bytes, or symbols received during the one or more time intervals. In such an embodiment, the ratio may be greater than a threshold value (e.g., '1') because, for example, $T_{LC}$ is not aligned with the timeslot boundary, but occurs before the timeslot boundary. In such an embodiment, the ratio may be less than a threshold value (e.g., '1') because, for example, $T_{LC}$ is not aligned with the timeslot boundary, but occurs after the timeslot boundary. The threshold value may be configurable and/or implementation specific. Configurability of the threshold may enable compensating for system biases and/or non-idealities. The clock may, for example, be adjusted in a first direction (e.g., a positive direction) if the ratio is greater than the threshold, adjusted in a second direction (e.g., a negative direction) if the ration is less than the threshold, and may not be adjusted if the ratio is equal to the threshold.

In another exemplary embodiment of the invention, the characterization may comprise comparing how many post-chirp bits, bytes, or symbols were received during the one or more time intervals and (ii) how many fore-chirp bits, bytes, or symbols were received during the one or more time intervals. The clock may, for example, be adjusted in a first direction (e.g., a positive direction) if the more post-chirp bits, bytes, or symbols than fore-chirp bits, bytes, or symbols were received during the one or more time intervals, be adjusted in a second direction (e.g., a negative direction) if the less post-chirp bits, bytes, or symbols than fore-chirp bits, bytes, or symbols were received during the one or more time intervals, and may not be adjusted if the same (or approximately the same) number of post-chirp bits, bytes, or symbols and fore-chirp bits, bytes, or symbols were received during the one or more time intervals.

In an exemplary embodiment of the invention, a communication system (e.g., an endpoint 104) may comprise one or more circuits operable to transmit and receive data wirelessly. The communication system may be assigned (e.g., via download, via manual programming, and/or via wireless signal(s) from a base station) a first timeslot (e.g., timeslot $332_{n,i}$) during which transmission can occur when an alarm condition is not present. The one or more circuits may be operable to detect the presence of an alarm condition. In response to the detection of the alarm condition, the one or more circuits may be operable to determine a second timeslot (e.g., timeslot $332_m$) based on the first timeslot and based on a hash function. The one or more circuits may be operable to transmit an alarm signal during the second timeslot.

In an exemplary embodiment of the invention, a communication system (e.g., an endpoint 104) may comprise one or more circuits operable to transmit and receive over a medium to which access is time-division multiplexed into a plurality of repeating windows (e.g., windows 302, 304, and 306). A first window (e.g., window 302) of the plurality of repeating windows may be time-division multiplexed into a plurality of timeslots (e.g., timeslots $322_{1,1}$-$322_{N,I}$). A second window (e.g., window 304) of the plurality of repeating windows may be time-division multiplexed into a plurality of timeslots (e.g., timeslots $332_1$-$332_M$). The assigned first timeslot may be one of the plurality of timeslots of the first window. The second timeslot may be one of the plurality of timeslots of the second window. The second timeslot may occur in the first instance of the second window to occur after the detection of the alarm condition. The first timeslot may not occur in every instance of the first window. A third window (e.g., window 306) of the plurality of windows may not be time-division multiplexed into a plurality of timeslots. The first timeslot may be reserved for transmissions of a first type (e.g., beacon packets) and the third window is utilized for transmissions of one or more second types (e.g., endpoint configuration data, data uploads from an endpoint, data downloads to an endpoint). The one or more circuits may comprise one or more acoustic, chemical, electrical, magnetic, mechanical, optical, and/or thermal sensors for performing the detection of the alarm condition.

In an exemplary embodiment of the invention, a communication system (e.g., an endpoint 104) may comprise a clock (e.g., clock 212) and may be operable to transmit and receive data via a wireless network (e.g., the network 108). The communication system may communicate over a medium to which access is time-division multiplexed into a plurality of timeslots (e.g., timeslots $332_{1,1}$-$332_{N,I}$). The communication system may be operable to receive signals during one or more time intervals (e.g., a time interval from $T_{LC}$–D to $T_{LC}$+D). The communication system may be operable to characterize the signals received during the one or more time intervals. The communication system may be operable to adjust the clock based on the characterization. The characterization may comprise determining a ratio of (i) end-of-timeslot bits, bytes, or symbols (i.e., bits, bytes, or symbols, such as, for example, the post chirp 456, that are transmitted at or near the end of a timeslot such as, for example, a timeslot 322) received during the one or more time intervals to (ii) beginning-of-timeslot bits, bytes, or symbols (i.e., bits, bytes, or symbols, such as, for example, the post chirp 456, that are transmitted at or near the beginning of a timeslot such as, for example, a timeslot 322) received during the one or more time intervals.

Access to the wireless network may be time-division multiplexed into a plurality of repeating windows. The one or more time intervals may occur during a first window of the plurality of repeating windows. The signals received during the one or more time intervals may have been transmitted by other endpoints (e.g., other ones of the endpoints $104_1$-$104_{20}$) in the wireless network. The communication system may be operable to transmit an alarm signal during a second window of the plurality of repeating windows. The communication system may comprise a clock and may be operable to synchronize the clock (e.g., clock 212) to a network clock (e.g., clock 202) during a third window of the plurality of repeating windows.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for low-power, long-range networking.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
 a plurality of sensors configured to communicate over a shared wireless medium, wherein:
  access to said medium is time-division multiplexed into three cyclically repeating windows;
  a first of said windows is reserved for connectionless beacons;
  a second of said windows is reserved for connectionless alarm signals;
  a third of said windows is an open access window available for bidirectional communications among said plurality of sensors; and
  a particular sensor of said plurality of sensors is operable to transmit a packet on said wireless medium, wherein said packet comprises a fore chirp portion, a data portion, and a post-chirp portion.

2. The system of claim 1, wherein:
 said first of said windows is time-division multiplexed into a plurality of first timeslots; and
 said second of said windows is time-division multiplexed into a plurality of second timeslots.

3. The system of claim 2, comprising an electronic device operable to:
 communicate with said plurality of sensors over said wireless medium; and
 manage access to said wireless medium by said plurality of sensors.

4. The system of claim 3, wherein said management of access to said wireless medium comprises assignment of occurrences of one or more of said first timeslots and/or occurrences of one or more of said second timeslots among said plurality of sensors.

5. The system of claim 2, wherein each one of said first plurality of timeslots is assigned to a respective one of said plurality of sensors.

6. The system of claim 2, wherein said electronic device is operable to assign any particular one of said second timeslots to one of said plurality of said sensors only upon detection of an alarm condition by said one of said plurality of sensors.

7. The system of claim 2, wherein the number of said first timeslots in said plurality of first timeslots is equal to the number of said sensors in said plurality of sensors.

8. The system of claim 2, wherein the number of said second timeslots in said plurality of second timeslots is less than the number of sensors in said plurality of sensors.

9. The system of claim 1, wherein said data portion comprises a device ID field that identifies said particular sensor of said plurality of sensors.

10. The system of claim 1, wherein said data portion comprises a duration field which indicates an amount of time since a last assignment of one of said first timeslots to said particular sensor of said plurality of sensors.

11. The system of claim 1, wherein said data portion comprises a shift magnitude field which indicates magnitude of a clock adjustment performed by said particular sensor of said plurality of sensors.

12. A system claim 1, wherein said data portion comprises a shift period field which indicates a number of occurrences of said first of said windows between successive adjustments of a clock of said particular sensor of said plurality of sensors.

13. The system of claim 1, wherein each of said plurality of sensors is operable to operate in a non-alarm mode of operation and an alarm mode of operation.

14. The system of claim 13, wherein, while operating is said non-alarm mode of operation, a particular sensor of said plurality of sensors is operable to:
- transmit beacons during one of said first timeslots assigned to said particular sensor;
- resynchronize a clock of said particular sensor to a network clock; and
- transmit and receive data during occurrences of said third window.

15. The system of claim 13, wherein, while operating in said alarm mode of operation, a particular sensor of said plurality of sensors is operable to:
- determine which one of said second timeslots to use for transmission of an alarm signal; and
- transmit an alarm signal on said determined one of said second timeslots.

16. The system of claim 15, wherein said particular sensor of said plurality of sensors is operable to determine said one of said second timeslots with use of a hash function.

17. The system of claim 16, wherein an identifier of one of said first timeslots assigned to said particular one of said plurality of sensors is an input to said hash function.

18. A system comprising:
- a plurality of sensors configured to communicate over a shared wireless medium, wherein:
  - access to said medium is time-division multiplexed into three cyclically repeating windows;
  - a first of said windows is reserved for connectionless beacons;
  - a second of said windows is reserved for connectionless alarm signals;
  - a third of said windows is an open access window available for bidirectional communications among said plurality of sensors; and
  - said data portion comprises a shift period field which indicates a number of occurrences of said first of said windows between successive adjustments of a clock of said particular sensor of said plurality of sensors.

19. The system of claim 18, wherein:
- said first of said windows is time-division multiplexed into a plurality of first timeslots; and
- said second of said windows is time-division multiplexed into a plurality of second timeslots.

20. The system of claim 19, comprising an electronic device operable to:
- communicate with said plurality of sensors over said wireless medium; and
- manage access to said wireless medium by said plurality of sensors.

21. The system of claim 20, wherein said management of access to said wireless medium comprises assignment of occurrences of one or more of said first timeslots and/or occurrences of one or more of said second timeslots among said plurality of sensors.

22. The system of claim 19, wherein each one of said first plurality of timeslots is assigned to a respective one of said plurality of sensors.

23. The system of claim 19, wherein said electronic device is operable to assign any particular one of said second timeslots to one of said plurality of said sensors only upon detection of an alarm condition by said one of said plurality of sensors.

24. The system of claim 19, wherein the number of said first timeslots in said plurality of first timeslots is equal to the number of said sensors in said plurality of sensors.

25. The system of claim 19, wherein the number of said second timeslots in said plurality of second timeslots is less than the number of sensors in said plurality of sensors.

26. The system of claim 18, wherein:
- a particular sensor of said plurality of sensors is operable to transmit a packet on said wireless medium, wherein said packet comprises a fore chirp portion, a data portion, and a post-chirp portion; and
- said data portion comprises a device ID field that identifies said particular sensor of said plurality of sensors.

27. The system of claim 18, wherein:
- a particular sensor of said plurality of sensors is operable to transmit a packet on said wireless medium, wherein said packet comprises a fore chirp portion, a data portion, and a post-chirp portion; and
- said data portion comprises a duration field which indicates an amount of time since a last assignment of one of said first timeslots to said particular sensor of said plurality of sensors.

28. The system of claim 18, wherein:
- a particular sensor of said plurality of sensors is operable to transmit a packet on said wireless medium, wherein said packet comprises a fore chirp portion, a data portion, and a post-chirp portion; and
- said data portion comprises a shift magnitude field which indicates magnitude of a clock adjustment performed by said particular sensor of said plurality of sensors.

29. The system of claim 18, wherein each of said plurality of sensors is operable to operate in a non-alarm mode of operation and an alarm mode of operation.

30. The system of claim 29, wherein, while operating is said non-alarm mode of operation, a particular sensor of said plurality of sensors is operable to:
- transmit beacons during one of said first timeslots assigned to said particular sensor;
- resynchronize a clock of said particular sensor to a network clock; and
- transmit and receive data during occurrences of said third window.

31. The system of claim 29, wherein, while operating in said alarm mode of operation, a particular sensor of said plurality of sensors is operable to:
- determine which one of said second timeslots to use for transmission of an alarm signal; and
- transmit an alarm signal on said determined one of said second timeslots.

32. The system of claim 31, wherein said particular sensor of said plurality of sensors is operable to determine said one of said second timeslots with use of a hash function.

33. The system of claim 32, wherein an identifier of one of said first timeslots assigned to said particular one of said plurality of sensors is an input to said hash function.

34. A system comprising:
- a plurality of sensors configured to communicate over a shared wireless medium, wherein:
  - access to said medium is time-division multiplexed into three cyclically repeating windows;
  - a first of said windows is reserved for connectionless beacons;
  - a second of said windows is reserved for connectionless alarm signals;
  - a third of said windows is an open access window available for bidirectional communications among said plurality of sensors;
  - each of said plurality of sensors is operable to operate in a non-alarm mode of operation and an alarm mode of operation; and while operating is said non-alarm mode of operation, a particular sensor of said plurality of sensors is operable to:
  transmit beacons during one of said first timeslots assigned to said particular sensor;
  resynchronize a clock of said particular sensor to a network clock; and
  transmit and receive data during occurrences of said third window.

35. The system of claim 34, wherein:
said first of said windows is time-division multiplexed into a plurality of first timeslots; and
said second of said windows is time-division multiplexed into a plurality of second timeslots.

36. The system of claim 35, comprising an electronic device operable to:
  communicate with said plurality of sensors over said wireless medium; and
  manage access to said wireless medium by said plurality of sensors.

37. The system of claim 36, wherein said management of access to said wireless medium comprises assignment of occurrences of one or more of said first timeslots and/or occurrences of one or more of said second timeslots among said plurality of sensors.

38. The system of claim 35, wherein each one of said first plurality of timeslots is assigned to a respective one of said plurality of sensors.

39. The system of claim 35, wherein said electronic device is operable to assign any particular one of said second timeslots to one of said plurality of said sensors only upon detection of an alarm condition by said one of said plurality of sensors.

40. The system of claim 35, wherein the number of said first timeslots in said plurality of first timeslots is equal to the number of said sensors in said plurality of sensors.

41. The system of claim 35, wherein the number of said second timeslots in said plurality of second timeslots is less than the number of sensors in said plurality of sensors.

42. The system of claim 34, wherein:
a particular sensor of said plurality of sensors is operable to transmit a packet on said wireless medium, wherein said packet comprises a fore chirp portion, a data portion, and a post-chirp portion; and
said data portion comprises a device ID field that identifies said particular sensor of said plurality of sensors.

43. The system of claim 34, wherein:
a particular sensor of said plurality of sensors is operable to transmit a packet on said wireless medium, wherein said packet comprises a fore chirp portion, a data portion, and a post-chirp portion; and
said data portion comprises a duration field which indicates an amount of time since a last assignment of one of said first timeslots to said particular sensor of said plurality of sensors.

44. The system of claim 34, wherein:
a particular sensor of said plurality of sensors is operable to transmit a packet on said wireless medium, wherein said packet comprises a fore chirp portion, a data portion, and a post-chirp portion; and
said data portion comprises a shift magnitude field which indicates magnitude of a clock adjustment performed by said particular sensor of said plurality of sensors.

45. The system of claim 44, wherein, while operating in said alarm mode of operation, a particular sensor of said plurality of sensors is operable to:
  determine which one of said second timeslots to use for transmission of an alarm signal; and
  transmit an alarm signal on said determined one of said second timeslots.

46. The system of claim 45, wherein said particular sensor of said plurality of sensors is operable to determine said one of said second timeslots with use of a hash function.

47. The system of claim 46, wherein an identifier of one of said first timeslots assigned to said particular one of said plurality of sensors is an input to said hash function.

* * * * *